US012272340B2

(12) United States Patent
Ranalli et al.

(10) Patent No.: US 12,272,340 B2
(45) Date of Patent: Apr. 8, 2025

(54) GUITAR STRAP LOCKING SYSTEM

(71) Applicants: Mark Ranalli, Canton, GA (US); Todd Scala, Johns Creek, GA (US); John Evans, Dunwoody, GA (US)

(72) Inventors: Mark Ranalli, Canton, GA (US); Todd Scala, Johns Creek, GA (US); John Evans, Dunwoody, GA (US)

( * ) Notice: Subject to any disclaimer, the term of this patent is extended or adjusted under 35 U.S.C. 154(b) by 270 days.

(21) Appl. No.: 18/122,672

(22) Filed: Mar. 16, 2023

(65) Prior Publication Data

US 2023/0410771 A1 Dec. 21, 2023

Related U.S. Application Data

(60) Provisional application No. 63/269,410, filed on Mar. 16, 2022.

(51) Int. Cl.
*G10G 5/00* (2006.01)
*G10D 3/00* (2020.01)

(52) U.S. Cl.
CPC ............... *G10G 5/005* (2013.01); *G10D 3/00* (2013.01)

(58) Field of Classification Search
CPC ................................ G10G 5/005; G10D 3/00
See application file for complete search history.

(56) References Cited

U.S. PATENT DOCUMENTS

| | | | | | | |
|---|---|---|---|---|---|---|
| 4,188,851 | A | * | 2/1980 | Wolf | G10G 5/005 | 84/327 |
| 4,271,999 | A | * | 6/1981 | Stravitz | G10G 5/00 | 24/666 |
| 4,274,181 | A | * | 6/1981 | Schaller | G10G 5/005 | 403/325 |
| 4,993,127 | A | * | 2/1991 | Mechem | G10G 5/005 | 24/324 |
| 5,669,118 | A | * | 9/1997 | Frano | A44B 11/04 | 24/666 |
| 6,080,922 | A | * | 6/2000 | Dimbath | G10G 5/005 | 84/421 |
| 6,169,238 | B1 | * | 1/2001 | Bolo, III | G10D 3/173 | 84/320 |
| 6,259,009 | B1 | * | 7/2001 | Bolo, III | G10G 5/005 | 84/322 |
| 6,590,145 | B2 | * | 7/2003 | Doiron | G10G 5/005 | 84/327 |
| 6,719,713 | B2 | * | 4/2004 | Mason | A61F 5/01 | 602/5 |
| 7,256,337 | B1 | * | 8/2007 | Walker | G10G 5/005 | 84/322 |
| 7,562,422 | B2 | * | 7/2009 | D'Addario | G10G 5/005 | 24/701 |
| 7,669,299 | B2 | * | 3/2010 | McAnelly | G10G 5/005 | 24/658 |
| 7,818,851 | B2 | * | 10/2010 | Perrotta | G10G 5/005 | 24/701 |
| 7,888,572 | B2 | * | 2/2011 | Rosenberg | G10G 5/005 | 84/327 |

(Continued)

*Primary Examiner* — Robert W Horn

(57) ABSTRACT

The guitar strap locking system includes a primary body having a guitar button receiving channel. A locking mechanism has a bias for being positioned in within the receiving channel for locking a guitar button in place and also capable of being positioned outside of the receiving channel for unlocking a guitar button.

3 Claims, 12 Drawing Sheets

(56) References Cited

U.S. PATENT DOCUMENTS

| | | | | |
|---|---|---|---|---|
| 8,436,240 | B1 * | 5/2013 | Coady | F16B 21/09 84/421 |
| 9,589,547 | B2 * | 3/2017 | Koster | A44B 13/0023 |
| 9,947,303 | B1 * | 4/2018 | Dulin | G10G 5/00 |
| 10,789,919 | B2 * | 9/2020 | Rognlien | G10G 5/005 |
| 10,971,120 | B2 * | 4/2021 | Kajihara | G10G 5/005 |
| D928,866 | S * | 8/2021 | Wolff | D17/20 |
| 11,094,303 | B2 * | 8/2021 | Black | A44B 17/0052 |
| 2002/0104425 | A1 * | 8/2002 | Warden | G10G 5/005 84/327 |
| 2007/0051225 | A1 * | 3/2007 | Dapergolas | G10G 5/005 84/327 |
| 2008/0163738 | A1 * | 7/2008 | Rosenberg | G10G 5/005 84/421 |
| 2011/0136359 | A1 * | 6/2011 | Gregg | H01R 13/639 439/148 |
| 2017/0206871 | A1 * | 7/2017 | Steinberger | A44B 17/007 |
| 2023/0410771 | A1 * | 12/2023 | Ranalli | G10G 5/005 |

* cited by examiner

GUITAR STRAP LOCKING SYSTEM

PRIORITY CLAIM

CROSS REFERENCE TO RELATED APPLICATIONS

This application claims the benefit pursuant to 35 U.S.C. § 119(e) of U.S. Provisional Patent Application having Ser. No. 63/269,410 entitled Rok-Lok having a filing date of Mar. 16, 2022. The contents of which are hereby incorporated by reference herein in their entirety.

TECHNICAL FIELD

The present invention relates to a guitar strap locking system in general and a guitar strap locking system which utilizes a biased locking arm which is easily moved from a locking to unlocking position providing for a quick release locking system for locking and unlocking a guitar strap with a guitar button.

DESCRIPTION

Guitar straps are utilized to position a guitar in a readily playable position by a guitarist. To accomplish this, guitars generally have a guitar button having a rounded knob top and a stem or neck piece connected to a guitar body. The guitar strap generally has leather end pieces which have an associated hole for receiving the knob of the guitar button and a slit connected to the hole which generally forms a keyhole configuration wherein the stem of the guitar button is slipped downward within the slit thereby maintaining the guitar strap on the body. Guitarists utilize straps placed across their shoulders for supporting a guitar while playing. These straps are typically made from leather or other fabric which contain a hole or channel positioned at their respective ends. A guitar typically utilizes buttons for securing the strap to the guitar. There are typically two strap buttons located on the body of a guitar, one near the base of the neck and one near the bottom end of the body. The placement of these buttons will vary depending on the make and model of the guitar. When the buttons are received through the respective strap holes, the buttons may be prone to slip out of the holes. Additionally, if the guitarist wants to perform a stunt wherein the guitar is spun around the guitarists upper body or shoulders, the risk of the guitar button slipping out prohibits such performance stunts. Accordingly, button locks or strap locks have been developed which secure the buttons within the respective strap holes.

However, it is more desirable to have a more secure connection. To achieve this secure connection, guitar button locking mechanisms have been developed. Some mechanisms require that the guitar button associated with a particular guitar be removed and replaced with a specific "knob" configuration specifically adapted to be associated with a specific locking mechanism. Others require a lot of manual effort to remove the lock once the guitar strap is attached to a guitar. The time required to remove such locks make them unsuitable in certain stage performances. Accordingly, a more desirable guitar locking strap system is needed which enables for the rapid attachment and detachment of a guitar strap to a guitar button.

DESCRIPTION OF THE DRAWING FIGURES

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

Figure 18:
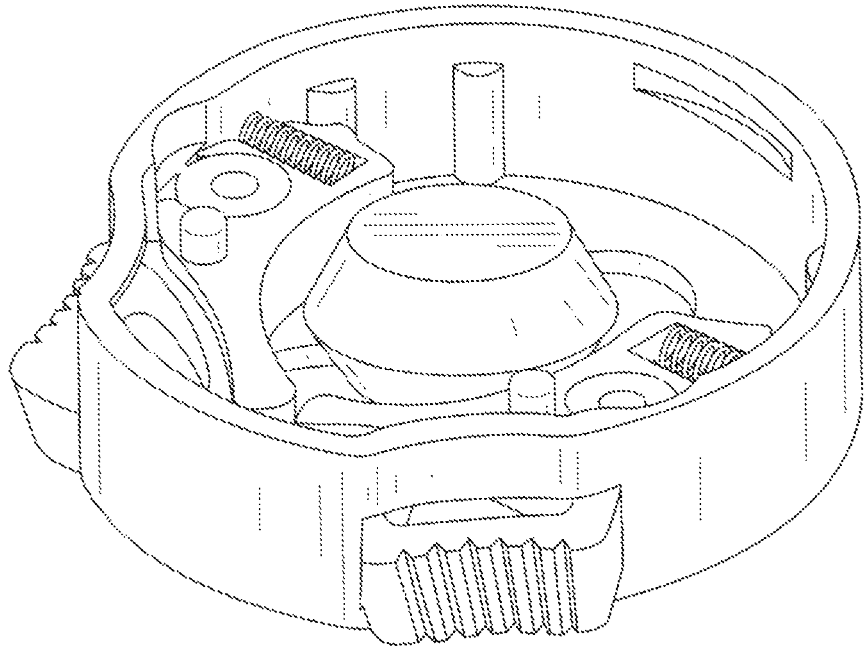
Figure 19:
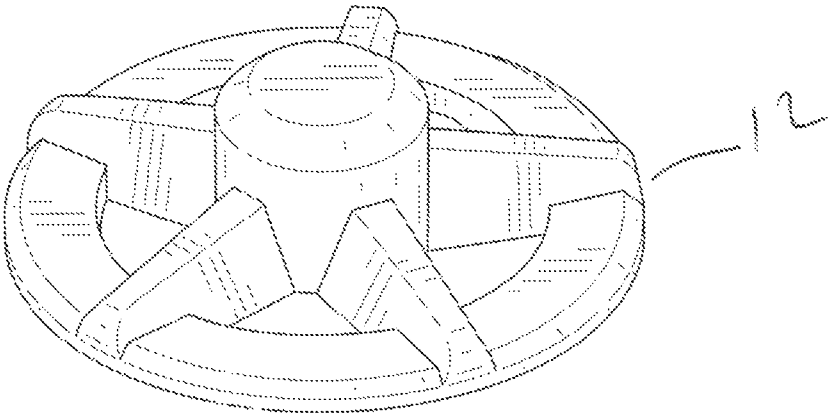
Figure 20:
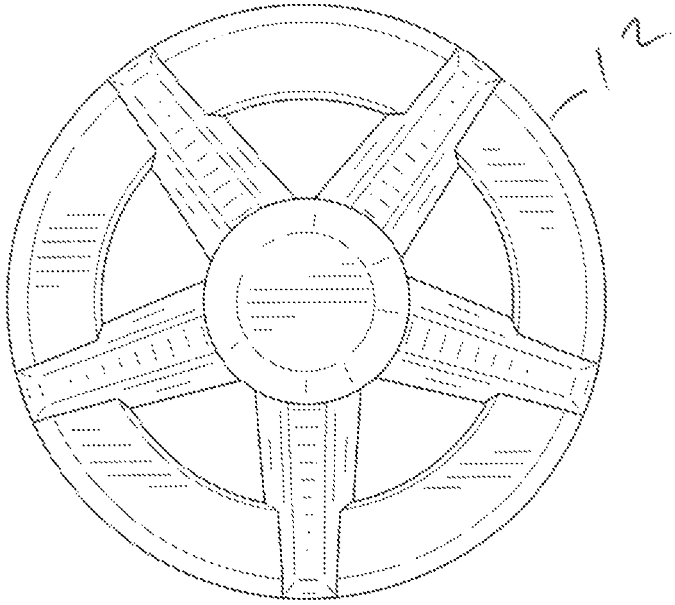

FIG. 18 is a view of the internal components of the guitar strap locking system as the guitar strap locking system continues in its fourth state enabling the guitar button to be removed from the guitar strap locking system according to an embodiment of the present invention; and FIGS. 19 and 20 illustrate the upper portion of the guitar strap locking system for securing the lower portion of the guitar strap locking system in engagement with a guitar strap according to an embodiment of the present invention.

SUMMARY OF THE INVENTION

A guitar strap locking system for a guitar having a guitar button having a knob and a stem and an associated guitar strap. The guitar strap locking system includes a primary body having a sidewall, a bottom and a top defining an internal cavity sufficiently sized to receive the knob of the guitar button. A guitar button receiving channel carried by the primary body for receiving the guitar button. The guitar button receiving channel having a proximate end and a distal end. A locking mechanism carried by the primary body for locking the guitar button within the receiving channel. A bias for manipulating the positioning of the locking mechanism with respect to the receiving channel. The locking mechanism including a biased swing arm wherein the bias is capable of manipulating the locking mechanism into the receiving channel blocking the positioning of the guitar button from the proximate end of the guitar button receiving channel to the distal end of the guitar button receiving channel. The locking mechanism being capable of being manipulated by the guitar button for overcoming the bias and positioning the locking mechanism in a manner wherein the passage to the distal end of the guitar button receiving channel is unblocked for the positioning of the guitar button at the distal end of the guitar button receiving channel. The locking mechanism being capable of being biased by the bias wherein the locking mechanism returns to blocking the receiving channel preventing the positioning of the guitar bottom from the distal end to the proximate end thereby locking the guitar button in position within the receiving channel. The locking mechanism being capable of being manipulated by an external force for overcoming the bias and positioning the locking mechanism in a manner wherein the passage to the proximate end of the guitar button receiving channel is unblocked for the positioning of the guitar button from the distal end to the proximate end for subsequent removal from the receiving channel.

A method of securing a guitar strap to a guitar having a guitar button having a knob and a stem. The method includes providing a guitar strap locking system comprising:

A guitar strap locking system for a guitar having a guitar button having a knob and a stem and an associated guitar strap. The guitar strap locking system includes a primary body having a sidewall, a bottom and a top defining an internal cavity sufficiently sized to receive the knob of the guitar button. A guitar button receiving channel carried by the primary body for receiving the guitar button. The guitar button receiving channel having a proximate end and a distal end. A locking mechanism carried by the primary body for locking the guitar button within the receiving channel. A bias for manipulating the positioning of the locking mechanism with respect to the receiving channel. The locking mechanism including a biased swing arm wherein the bias is capable of manipulating the locking mechanism into the receiving channel blocking the positioning of the guitar button from the proximate end of the guitar button receiving channel to the distal end of the guitar button receiving channel. The locking mechanism being capable of being manipulated by the guitar button for overcoming the bias and positioning the locking mechanism in a manner wherein the passage to the distal end of the guitar button receiving channel is unblocked for the positioning of the guitar button at the distal end of the guitar button receiving channel. The locking mechanism being capable of being biased by the bias wherein the locking mechanism returns to blocking the receiving channel preventing the positioning of the guitar bottom from the distal end to the proximate end thereby locking the guitar button in position within the receiving channel. The locking mechanism being capable of being manipulated by an external force for overcoming the bias and positioning the locking mechanism in a manner wherein the passage to the proximate end of the guitar button receiving channel is unblocked for the positioning of the guitar button from the distal end to the proximate end for subsequent removal from the receiving channel. A guitarist positions a guitar button in the proximate end of the receiving channel. The guitarist moves the guitar button towards the distal end of the receiving channel such that the guitar button engages the locking mechanism with sufficient force to manipulate the locking mechanism wherein the locking mechanism pivots in a manner clearing the path of the guitar button to the distal end of the receiving channel. The guitarist manipulates the guitar button to the distal end of the receiving channel enabling the locking mechanism to return to the position wherein the receiving channel is blocked by the locking mechanism locking the guitar button in position at the distal end of the receiving channel.

Preferred Embodiment

As described herein, a preferred embodiment of a guitar strap locking system is disclosed. This is the preferred embodiment, additional embodiments utilizing the innovative features of the invention may be developed. Such additional embodiments may constitute derivations of the innovative concepts but include the essence of the invention.

Figure 1:
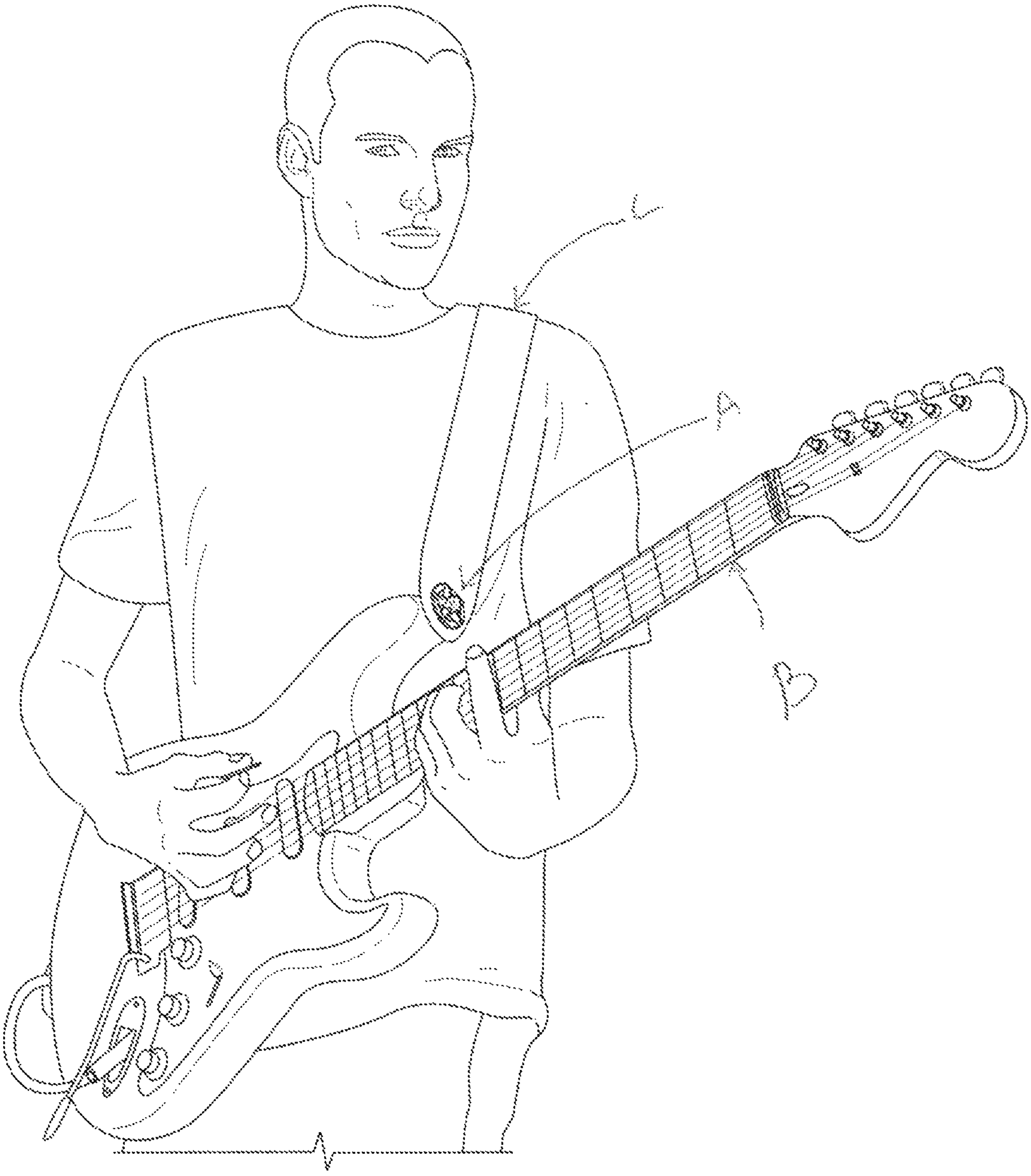
FIG. 1 is a general view of a guitarist playing a guitar and utilizing guitar strap locking system according to an embodiment of the present invention.

As shown in FIG. 1, a guitar strap locking system is utilized to secure a guitar B via a guitar strap C to a guitarist. In a normal operating manner, guitar B includes a guitar button which is utilized for attachment by guitar strap locking system A.

Figure 2:
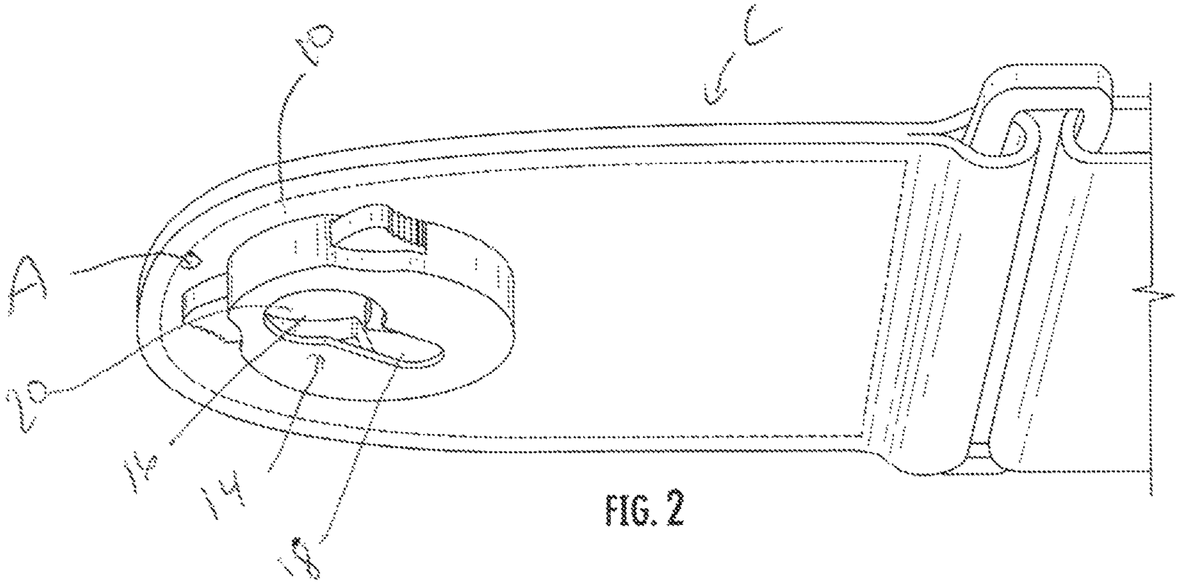
FIG. 2 illustrates the primary body of the guitar strap locking system attached to an end of a guitar strap according to an embodiment of the present invention.
Figure 3:
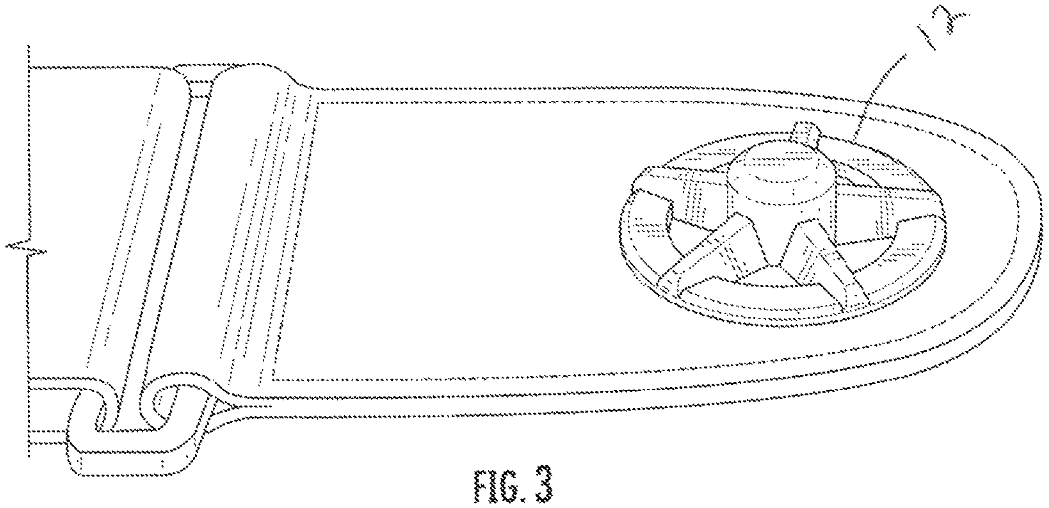
FIG. 3 illustrates the upper portion of a guitar strap carrying the securing mechanism of the guitar strap locking system for securing the guitar strap locking system onto the guitar strap according to an embodiment of a present invention.

As shown in FIGS. 2 and 3, guitar strap locking system A includes a primary body 10 and a securing mechanism 12. Primary body 10 include a guitar button receptacle 14 for receiving a guitar button attached to guitar B. Guitar button receptacle 14 is preferably of a keyhole design having an upper portion of a general diameter 16 sufficient to receive a guitar button having an illustrates the guitar strap locking system A attached to an end 10 of guitar strap C.

FIG. 3 illustrates the upper portion of a guitar strap carrying the securing mechanism 12 of the guitar strap locking system for securing the primary body of the guitar strap locking system onto the guitar strap. Primary body 10 carries a threaded bolt which extends through the opening of the guitar strap. Securing mechanism 12 includes a threaded female counterpart for receiving the threaded bolt. Securing mechanism 12 is screwed downward thereby compressing the guitar strap between the primary body and securing mechanism and maintaining the guitar strap locking system securely engaged with the guitar strap.

Figure 4:
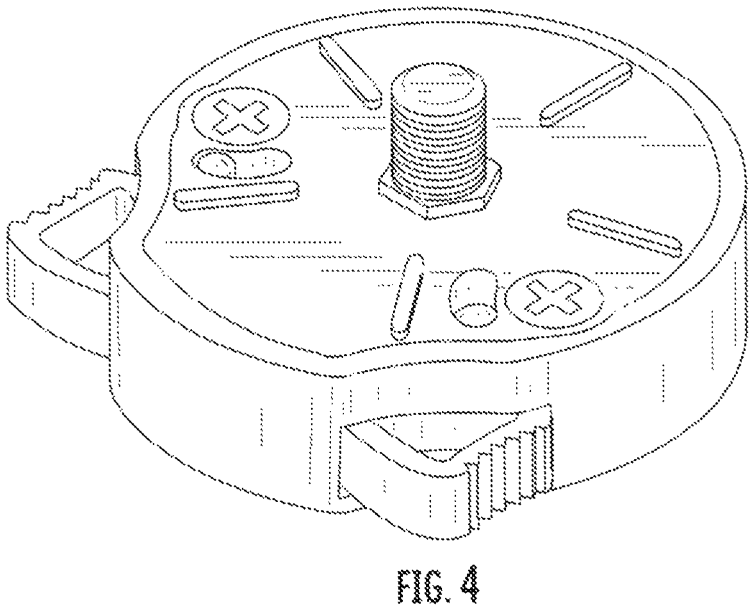
FIG. 4 is a perspective view of the top of the primary body of the guitar strap locking system according to an embodiment of the present invention.
Figure 5:
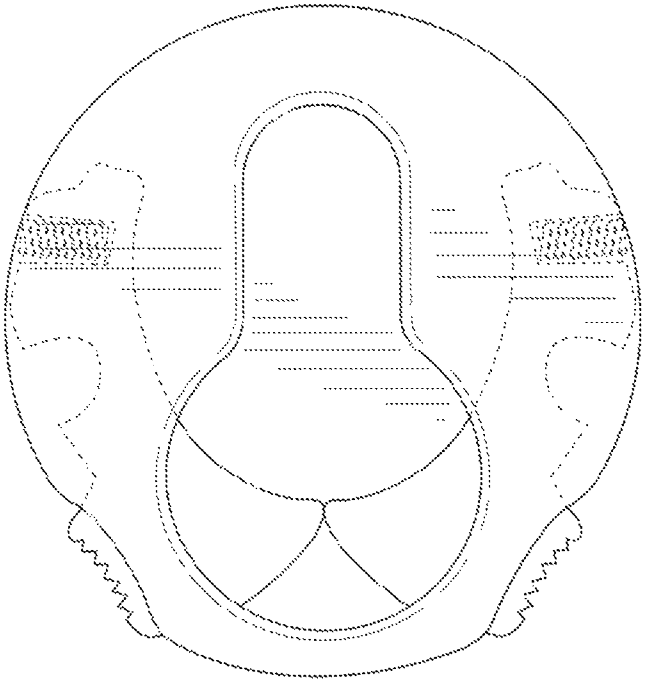
FIG. 5 is a perspective view of the bottom of the primary body of the guitar strap locking system in the final position for removal of a guitar button from the guitar strap locking system according to an embodiment of the present invention.

FIGS. 4 and 5 illustrate the primary body 10 of the guitar strap locking system A. Primary body 10 includes a guitar strap facing surface 20 which comprises the top of the primary body 10. Guitar strap facing surface 20 includes raised tabs to provide frictional engagement with a guitar strap preventing the primary body 20 from slipping when attached to a guitar strap. The guitar strap facing surface 20 also carries a threaded bolt 24 for attachment to securing mechanism 12 thereby retaining the primary body intact with the guitar strap. Guitar strap facing surface includes a right swing arm pivoting channel or slot 26 and a left swing arm pivoting channel or slot 28.

Primary body 10 includes a housing 22 which preferably includes a back 30 and a sidewall 32 which extends upward from back 30 and extends to guitar strap facing surface 20. In the preferred embodiment, sidewall 32 defines the outer periphery of primary body 20 and in conjunction with back 30 defines an interior cavity 36 housing the locking mechanism components. Preferably guitar strap facing surface is received within the periphery defined by sidewall 32.

Sidewall 32 includes a left swing arm opening 38 enabling the upper segment of left swing arm 40 to extend from interior cavity 36 past the outer periphery of primary body 20 for engagement by a guitarist. Sidewall 32 includes a right swing arm opening 42 enabling the upper segment of right swing arm 44 to extend from interior cavity 36 past the outer periphery of primary body 20 for engagement by a guitarist.

FIG. 5 illustrates the guitar button retention system D which includes a guitar button opening 60 and a guitar button receiving channel 62 defined within back 30. Guitar button opening 60 is in communication with guitar button receiving channel 62 permitting the knob of the guitar button to be received within the guitar button opening into the interior of the primary body 20 in a manner that the neck of the guitar button may be aligned with guitar button receiving channel 32. FIG. 5 is a perspective view of the bottom of the primary body of the guitar strap locking system in the final position for removal of a guitar button from the guitar strap locking system.

Figure 6:
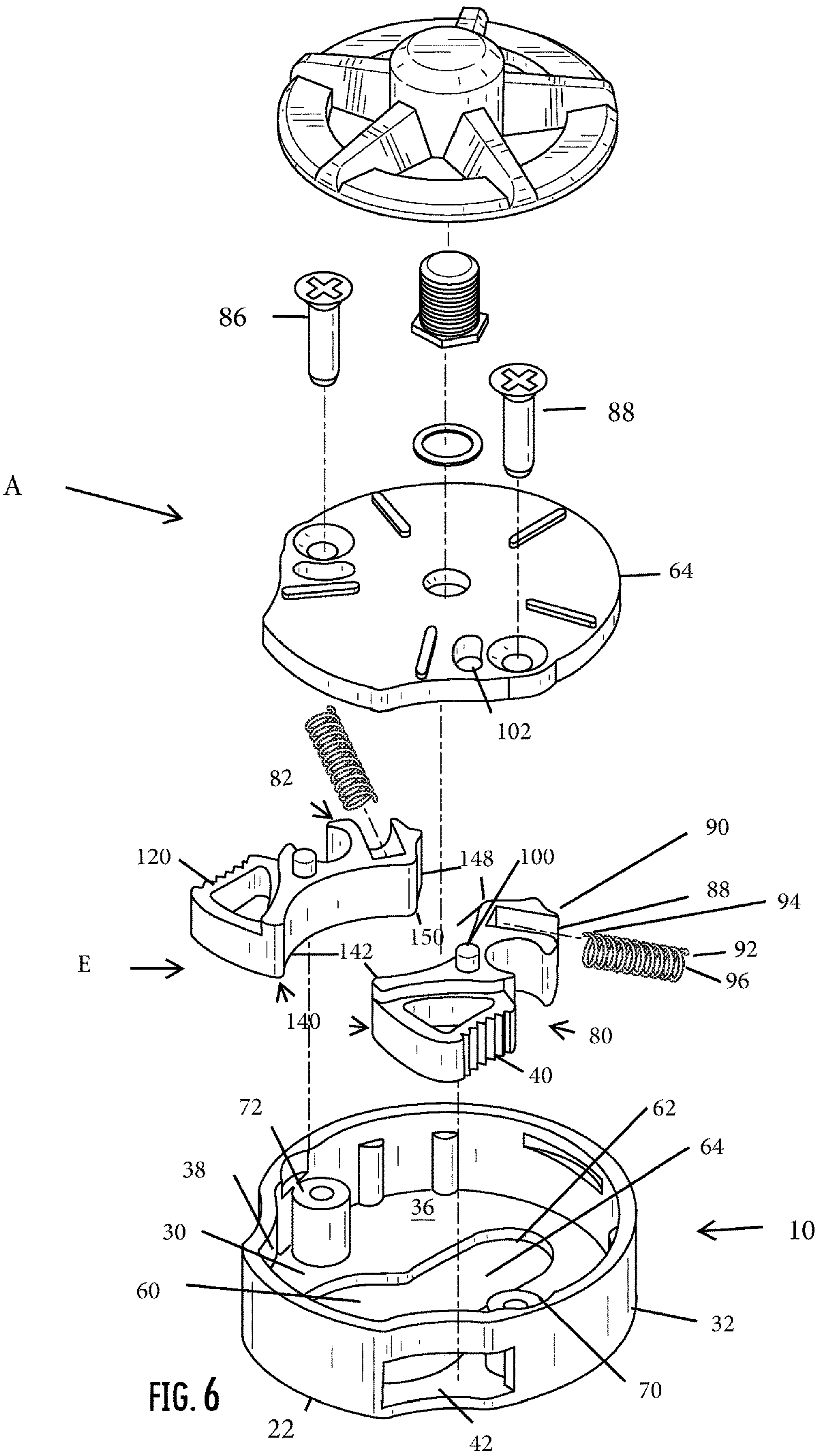
FIG. 6 is an exploded view of the guitar strap locking system according to an embodiment of the present invention.

FIG. 6 illustrates the components of the guitar strap locking system A. Primary body includes housing 22 which includes a back 30 and sidewall 32 which define interior cavity 36. A top plate 64 which defines guitar strap facing surface covers the interior cavity. The interior cavity as defined by sidewall 32 is of sufficient depth and width to receive and enclose the knob of the guitar button. Sidewall 32 defines left swing arm opening 38 and right swing arm opening 42 which permits the upper segments of the left and right swing arms respectfully to extend outside of the cavity for activation by a user. Guitar button opening 60 is defined by the back 30 of primary body 10. Guitar button opening 60 is of sufficient size to receive the knob of a guitar button. Guitar button opening 60 defines the upper portion of guitar button channel 64. Guitar button opening 60 communicates with receiving channel 62 which is of sufficient width to receive the stem or neck of a guitar button but narrower than the width of the guitar button knob. In the preferred embodiment, guitar button opening 60 and receiving channel 62 are of a keyhole configuration. Pivot posts 70 and 72 are utilized to provide pivot points for left swing arm 80 and right swing arm 82 as well as receiving screws 86 and 88 for retaining top plate 64 with primary body 10.

As shown in FIG. 6. a key component of the guitar strap locking system A is a locking mechanism E which includes a biased pivoting swing arm for blocking the receiving channel which will result in the guitar button being locked into place securing the guitar strap with the guitar. The pivoting swing arm 80 preferably includes an upper segment swing arm 40 which preferably is ribbed for frictional engagement by the finger of a guitarist to operate the guitar strap locking mechanism The pivoting swing arm 80 preferably includes a smooth concave pivoting surface disposed in the general center of the swing arm 80 for engaging pivot post 70. The pivoting swing arm 80 includes a distal end 90 preferably includes a bias channel 88 for receiving a bias 92. Bias 92 is preferably a spring of a predetermined tension. First end 94 of bias 92 is positioned to abut the end of bias channel 88 and a distal second end 96 is positioned to abut the interior of sidewall 32. In this manner, bias 92 biases pivoting swing arm 80 in a manner that the distal end is biased such that the distal end intersects receiving channel 62. Preferably bias channel is configured to run in a 7-2 o'clock position wherein the bias pushes the swing arm "up and out". Further assistance for pivoting is provided by pivot pin 100 which extends through pivot slot 102 disposed within top plate 64. Pivot slot 102 provides upward and downward travel of the pivoting swing arm as the bias influences the pivoting swing arm or as a guitarist influences the bias by manipulating the upper segment of the swing arm.

In the preferred embodiment a left swing arm 110 and right swing arm 120 are of the same construction. Each swing arm has a guitar button engagement surface 140. Guitar button engagement surface is intended for engaging the guitar button locking the guitar button into place within receiving channel 62. Guitar button engagement surface preferably has an upper guitar button engagement surface portion 142 and a lower guitar button engagement surface portion 148. Disposed between the upper and lower guitar button engagement surface portions is transitional ledge 150 which extends laterally outward from the upper and lower guitar button engagement surface portions. The extension of transitional ledge 150 is the portion of the respective left and right swing arms which project into receiving channel 62 thereby locking the guitar button in place.

As shown in FIG. 6, the guitar button engagement surface preferably has a reverse "S" configuration. The upper guitar button engagement surface preferably ha a concave profile. With the right and left swing arms being oppositely disposed, the upper guitar button engagement surfaces of the right and left swing arms from a "O" of a size which generally corresponds to the guitar button opening 60. In this configuration, the knob of the guitar button simultaneously is received by guitar button opening 60 and within the profiles of the left and right swing arms into the interior of the primary body. This configuration prepares the guitar button knob for receipt by the guitar strap locking system and subsequent securement. At the lower portion of the concave profile of the upper guitar button engagement surfaces of the right and left swing arms is the transitional ledge. The lower portion of the guitar button engagement surfaces extend downward from the transitional ledge at an angle away from the transitional ledge such that the transitional ledge is the farthest point laterally away from the side edges of the primary body extending into the receiving channel. The lower portion of the guitar button engagement surfaces are configured in width less than the transitional ledge providing clearance for the guitar button stem to be received or in contact with the lower portion of the guitar button engagement surfaces when the guitar button stem is received in the receiving channel and locked into position within the receiving channel by the transitional edges engaging the guitar button stem.

As shown in FIG. 6, a threaded bolt xx is carried by top plate xx for mating attachment with securing mechanism xx.

Figure 7:
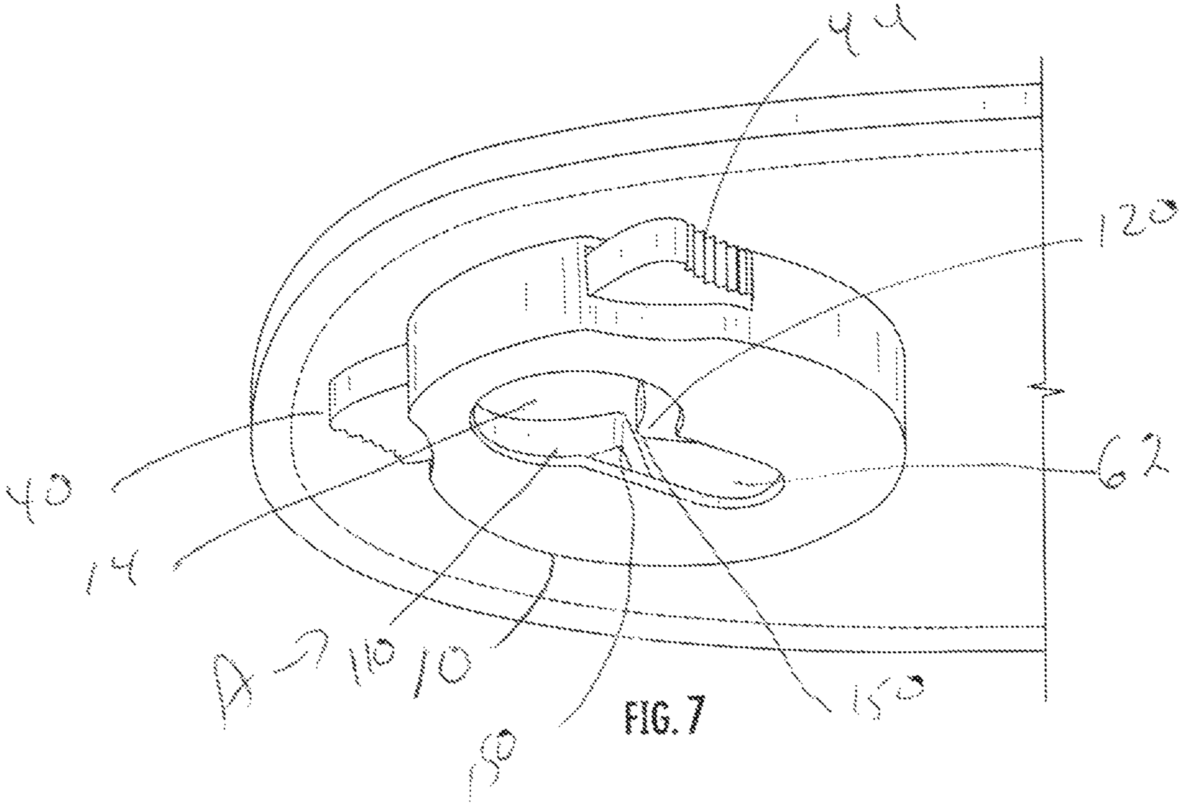
FIG. 7 is a perspective view of the primary body of the guitar strap locking system as attached to a guitar strap ready to receive the knob of a guitar button according to an embodiment of the present invention.

FIGS. 7-11 illustrate the operation of the guitar strap locking system A. FIG. 7 is illustrates primary body 10 as attached to a guitar strap ready to receive the knob of a guitar button. In this ready state, or state zero, the left 110 and right 120 swing arms are biased into a position wherein the transitional ledges 150 of the oppositely disposed left and right swing arms are positioned within the receiving channel 62 blocking the receiving channel. The upper portions of the left and right swing arm guitar engagement surfaces 110 form a "O" vertically aligned with the upper receiving opening 14 for receiving the knob of a guitar button. As shown in FIG. 7 the upper portion of the left and right swing arms 40, 44 are in their natural position wherein they are biased outward. In this position, the guitar strap locking system A I in position to receive the know of the guitar button, this is also the position which the guitar strap locking system is in when the guitar button is secured by the device thereby locking the guitar strap in association with the guitar.

Figure 8:
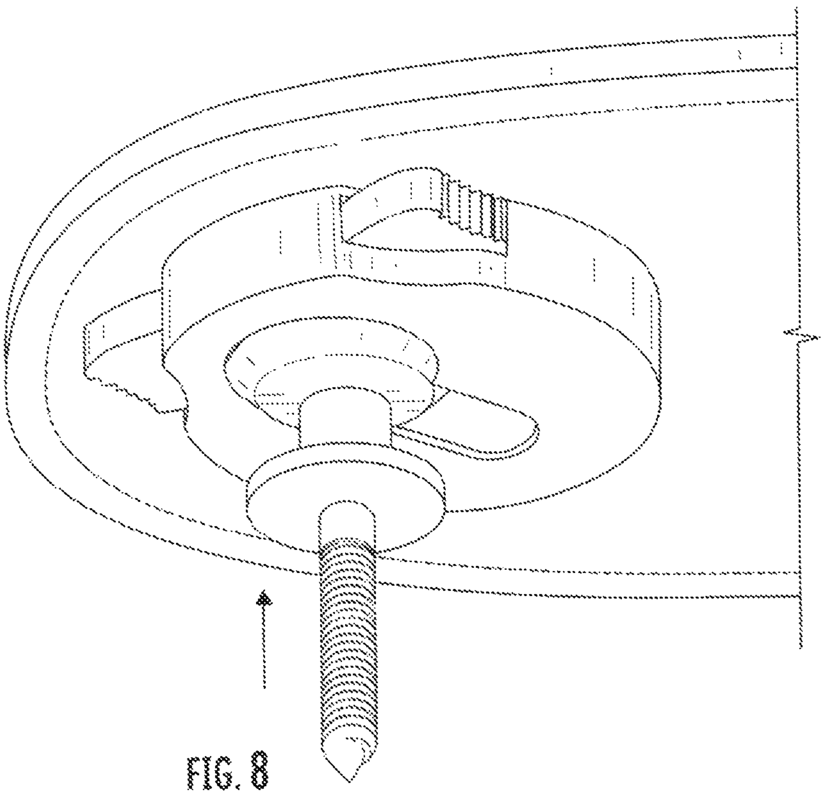
FIG. 8 is a perspective view of the primary body of the guitar strap locking system as attached to a guitar strap initially receiving the knob of a guitar button according to an embodiment of the present invention.

FIG. 8 is a perspective view of the primary body of the guitar strap locking system as attached to a guitar strap initially receiving the knob of a guitar button. In this state, the guitar strap locking system has not locked the guitar button, but the guitar button is in position for subsequent transitioning down the receiving channel and subsequent engagement of the transitional ledges.

Figure 9:
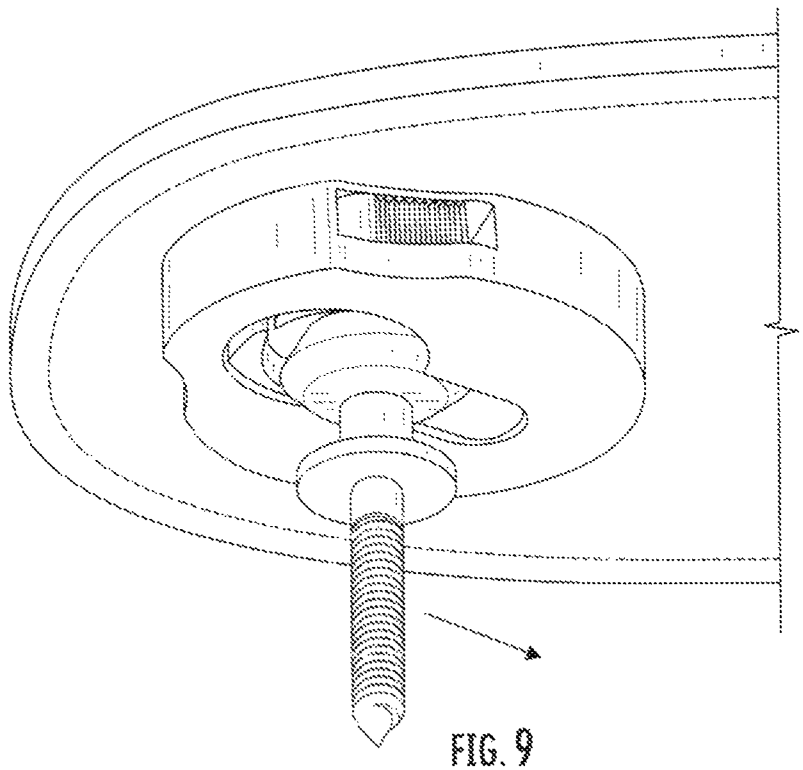
FIG. 9 is a perspective view of the primary body of the guitar strap locking system as attached to a guitar strap receiving the knob of a guitar button as the knob is moved to a locking position according to an embodiment of the present invention.

FIG. 9 is a perspective view of the primary body of the guitar strap locking system as attached to a guitar strap receiving the knob of a guitar button as the knob is moved down the receiving channel engaging the transitional ledges which block the receiving channel. In this position the upper segments of the swing arms move inward into the interior of the primary body due to the swing arms being pushed aside by the force of the guitar button moving down the receiving channel. The bias which urges the swing arms in its state zero block the channel has a predetermined tension which is can be overcome by the force of the guitar button engaging the respective transitional ledges in this state. The contact force of the guitar button urges the respective pivotal swing arms to be displaced thereby clearing the receiving channel enabling the guitar button to continue along the receiving channel to the receiving channel's end.

Figure 10:
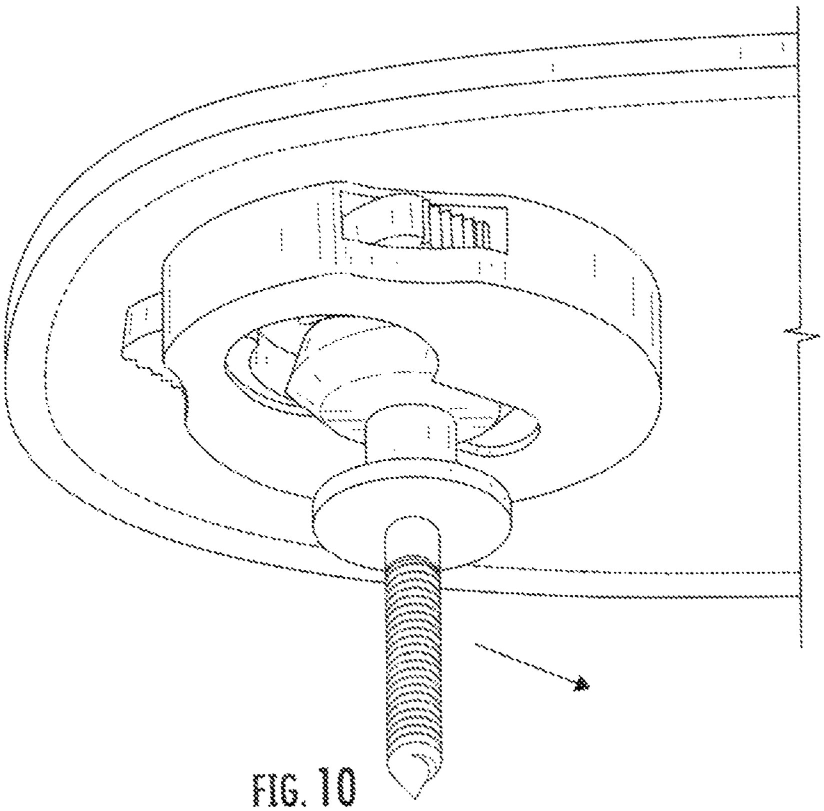
FIG. 10 is a perspective view of the primary body of the guitar strap locking system as attached to a guitar strap receiving the knob of a guitar button is moved to a locking position according to an embodiment of the present invention.

FIG. 10 is a perspective view of the primary body of the guitar strap locking system as attached to a guitar strap receiving the knob of a guitar button is moved to a locking position. Once the guitar button passes the transitional ledges and loses contact with the transitional ledges, the respective left and right pivotal swing arms pivot back to their original position thereby blocking the receiving channel.

Figure 11:
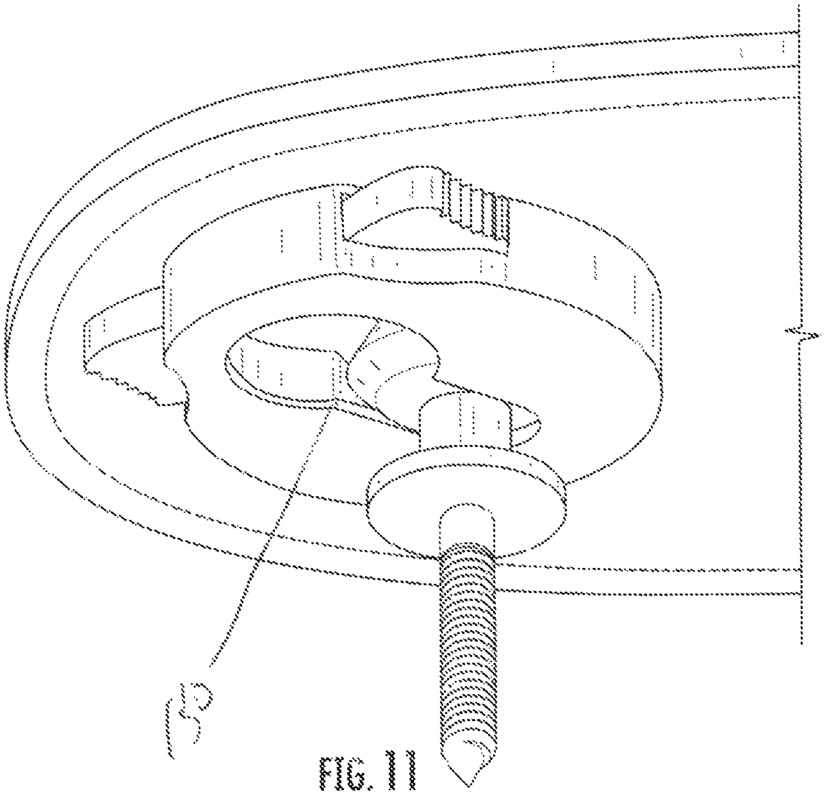
FIG. 11 is a perspective view of the primary body of the guitar strap locking system as attached to a guitar strap as the knob of the guitar button is locked into place according to an embodiment of the present invention.

FIG. 11 is a perspective view of the primary body of the guitar strap locking system as attached to a guitar strap as the knob of the guitar button is locked into place. In this position the guitar button is past the left and right pivoting swing arms enabling the swing arms to pivot back to their original position. The transitional ledges 150 abut the guitar button blocking the receiving channel. The left and right pivoting swing arms cannot pivot by a force of the guitar button moving up the channel, thus locking the guitar button in place. It is understood that reference to locking the guitar button includes preventing movement of the guitar button by restraining movement of the guitar button knob or stem.

Figure 12:
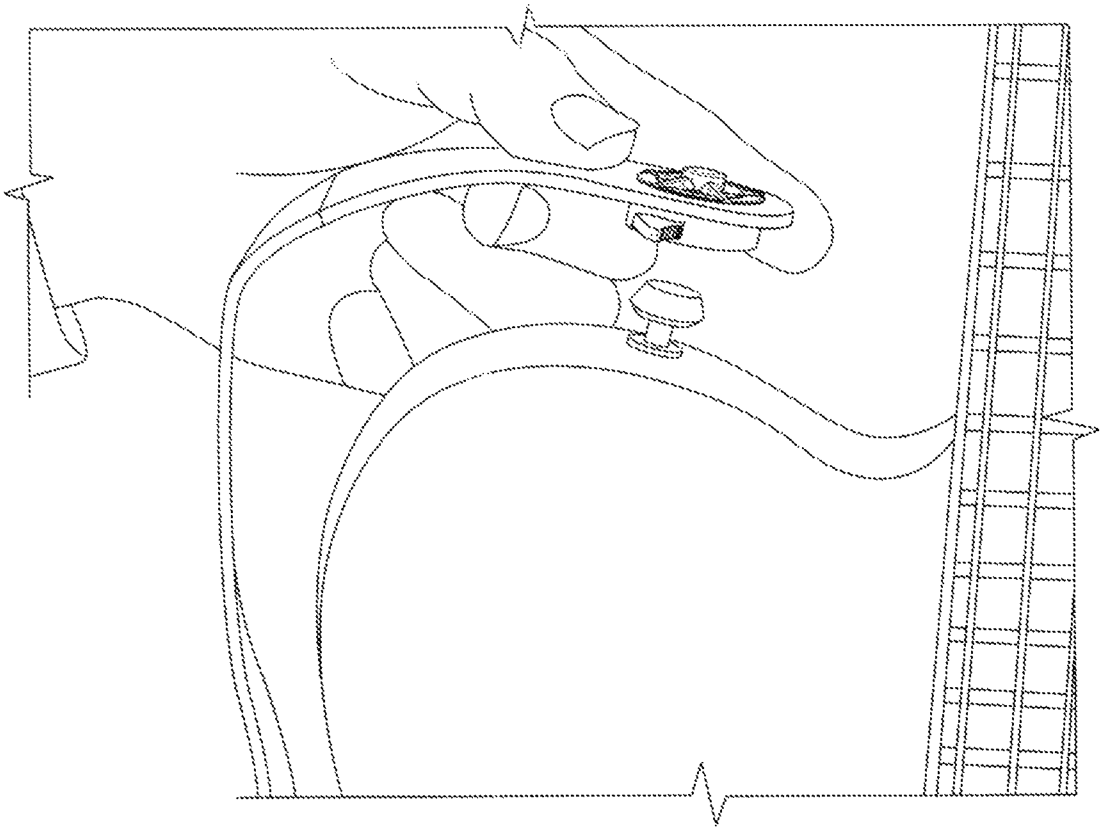
FIG. 12 illustrates the guitar strap locking system ready for attachment to the guitar button according to an embodiment of the present invention.

FIG. 12 illustrates the secured guitar button locking system secured to a guitar strap ready to receive a guitar button and subsequently interlock the guitar strap with the guitar.

Figure 13:
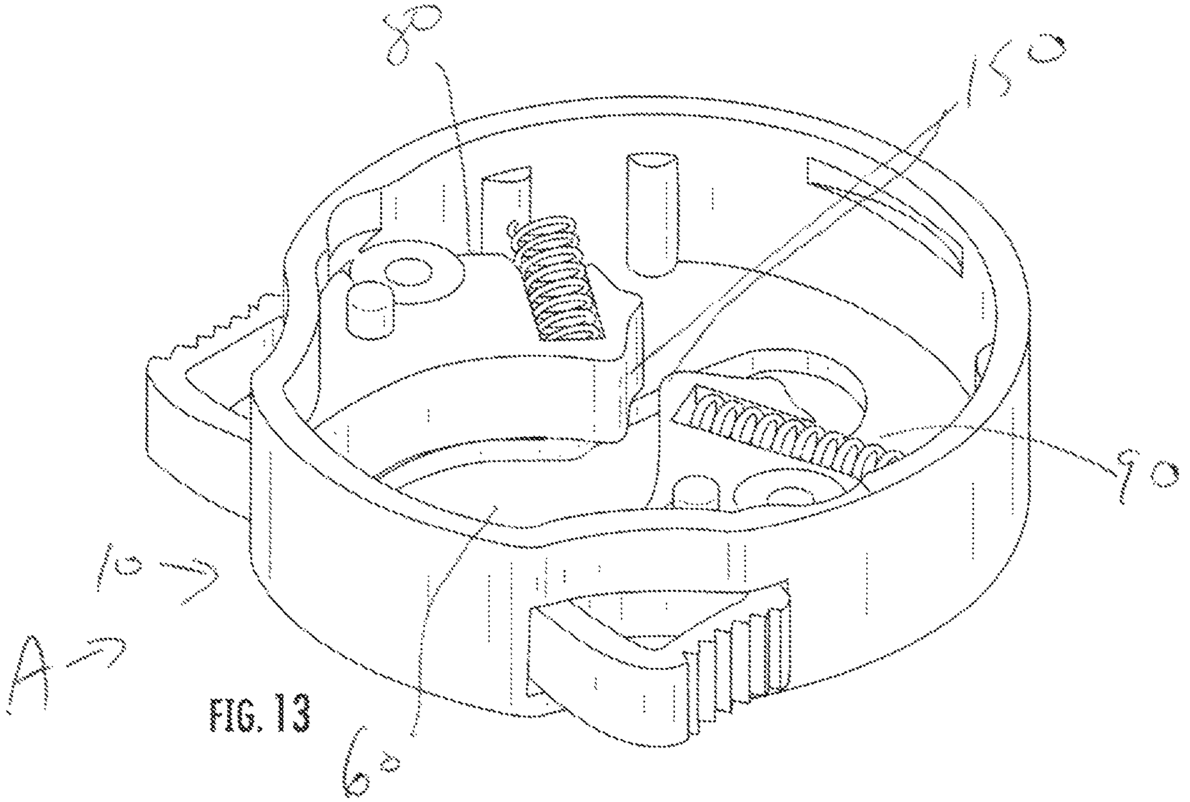
FIG. 13 is a view of the internal components of the guitar strap locking system as the guitar strap locking system is in its zero neutral state ready to receive a guitar button according to an embodiment of the present invention.

FIGS. 13 through 18 illustrate the interactions of the locking components of the guitar strap locking system A. As shown in FIG. 13, the guitar strap locking system is in its neutral state wherein the bias biases the locking member into position such that the transitional ledges overlap the receiving channel. Additionally, the upper portions of the locking members are in ready position to receive the guitar button.

Figure 14:
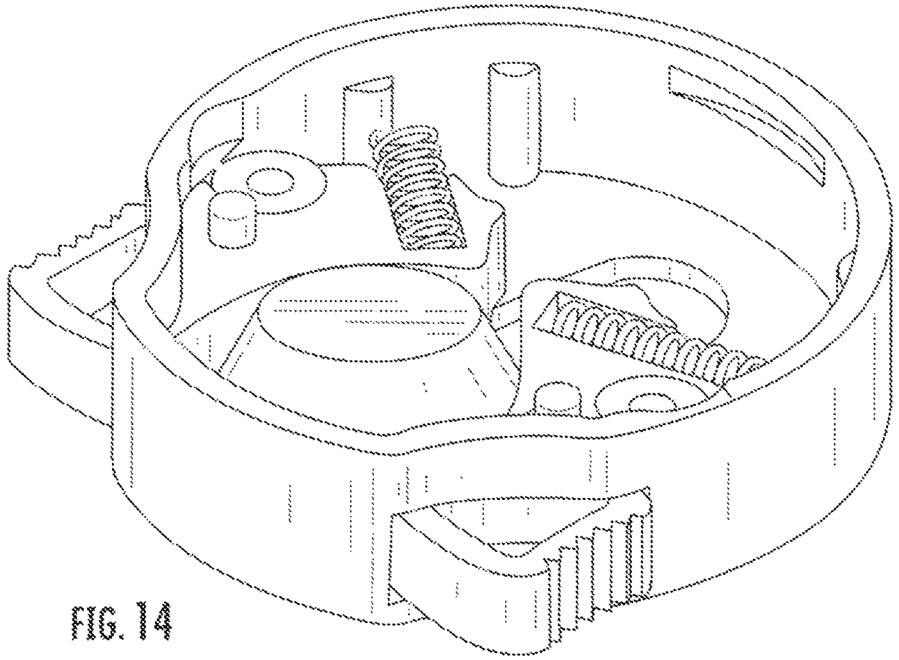
FIG. 14 is a view of the internal components of the guitar strap locking system as the guitar strap locking system is in its first state receiving the guitar button according to an embodiment of the present invention.

FIG. 14 is a view of the internal components of the guitar strap locking system as the guitar strap locking system is in its first state receiving the guitar button. The know of the guitar button is received within the internal cavity of the primary body and in a ready position for sliding down the receiving channel for engaging the transitional ledges which block the receiving channel. As shown, the biases maintain the swing arms in position for blocking the receiving channel.

Figure 15:
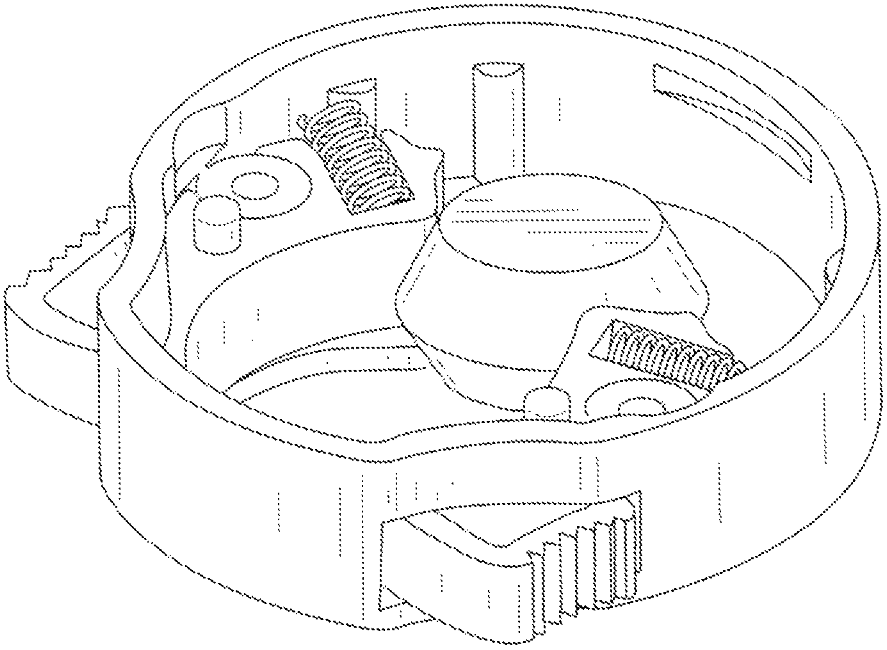
FIG. 15 is a view of the internal components of the guitar strap locking system as the guitar strap locking system is in it's second state receiving the guitar button wherein the guitar button displaces the locking arms as the guitar button passes into a locked position according to an embodiment of the present invention.

FIG. 15 is a view of the internal components of the guitar strap locking system as the guitar strap locking system is in its second state receiving the guitar button wherein the guitar button displaces the locking arms as the guitar button passes into a locked position. This is a key component of the invention. The tension which the bias utilizes to maintain the swing arms in a state wherein the transitional ledges block the receiving channel is not greater than the force exerted onto the transitional ledges by the guitar button passing from the upper end of the keyhole receiving channel to the lower end. The pivoting swing arms pivot in a manner allowed by the pivoting slots clearing the path for the guitar button to pass by the transitional ledges and being received by the distal end of the key hole.

Figure 16:
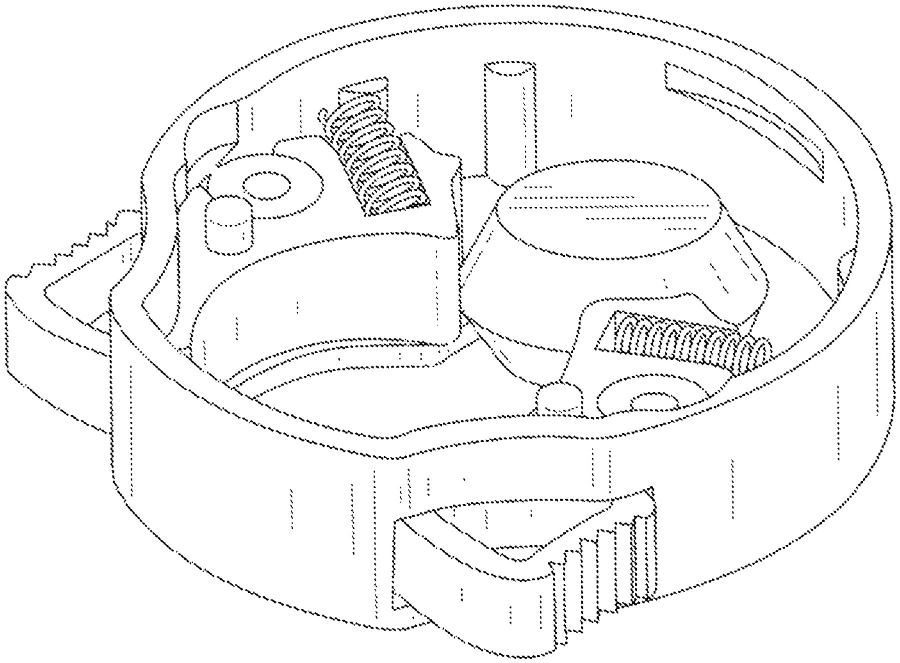
FIG. 16 is a view of the internal components of the guitar strap locking system as the guitar strap locking system in in its third state locking the guitar button in place according to an embodiment of the present invention.

FIG. 16 is a view of the internal components of the guitar strap locking system as the guitar strap locking system in in its third state locking the guitar button in place. In this position, the guitar button has passed in the keyhole channel below the transitional ledges and received in the bottom portion of the receiving channel. The force which the guitar button had exerted onto the swingarms and subsequently their biases has been removed. With the removal of this force, the biases provide their neutral state influence onto the respective swing arms thereby positioning the transitional ledges back to their original positions and blocking the movement of the guitar button upward towards the upper portion of the keyhole. The guitar button is locked into position by the immoveable swing arms and their respective transitional ledges.

FIG. 18 is a view of the internal components of the guitar strap locking system as the guitar strap locking system continues in its fourth state enabling the guitar button to be removed from the guitar strap locking system. In this position, the upper segments of the swing arms are depressed by the guitarist. This action overcomes the tension provided by the respective biases enabling the respective swing arms to pivot in a manner wherein the lower portion of the swing arms are pivoted away from the receiving channel thereby moving the transitional ledges away from the receiving channel and opening up a clear path from the lower portion of the key hole channel to the upper portion of the key hole channel. This is the unlocked position. FIG. 18 illustrates the guitar button traversing upward in the channel enabling the knob of the guitar button to become aligned with the upper portion of the key hole for removal.

Figure 17:
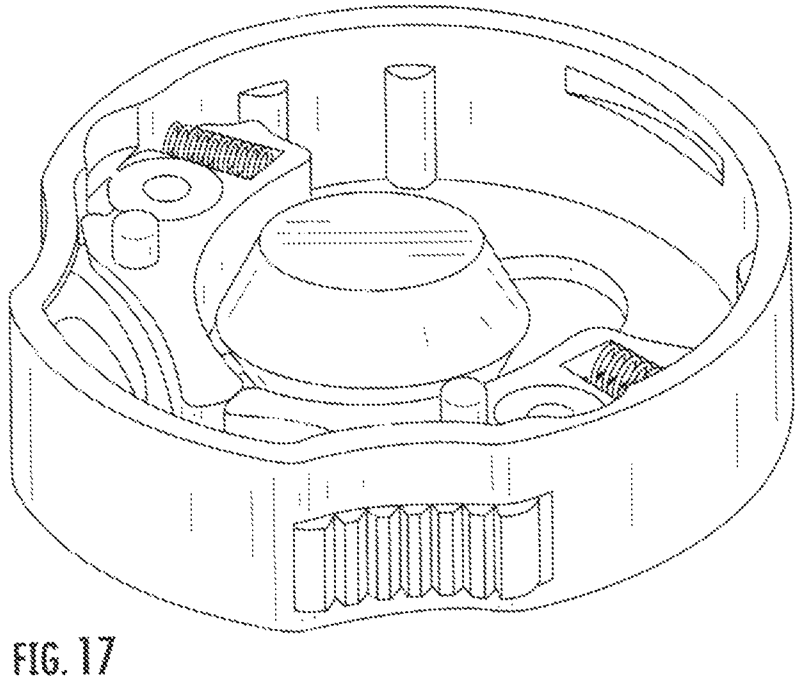
FIG. 17 is a view of the internal components of the guitar strap locking system as the guitar strap locking system is in it's fourth state wherein the locking arms are displaced clearing the locking channel for removal of the guitar button according to an embodiment of the present invention.

FIG. 17 illustrates the full depression of the upper portion of the respective swing arms wherein the upper portion of the respective swing arms are offset from one another forming a "O" aligned with the upper portion of the keyhole which enables the knob of the guitar button to pass through the key hole and exit the primary body of the guitar strap locking system.

Accordingly in operation, a guitar strap locking system utilizes pivoting swing arms for blocking a guitar button within a channel thereby locking the guitar button within the profile of a locking body. The pivoting swing arms are biased in a position which initially blocks the receiving channel. Subsequent lateral movement of the guitar button within the receiving channel overcomes the bias and pivots the pivoting swing arms in a manner which unblocks the receiving channel enabling the guitar button to pass by the swing arms and engage the lower portion of the receiving channel. With the passing of the guitar button past the respective swing arms and the release of the force presented by the guitar button pivoting the swing arms away from the receiving channel overcoming the initial tension of the bias the bias return to their original positions forcing the swing arms back into their initial position blocking the guitar button from returning up the receiving channel. This is the "locked position". Removal of the guitar button from the locking system requires the presence of a force onto the swing arms overcoming the tension of the bias resulting in the swing arms pivoting away from the receiving channel and opening a clear passage in the receiving channel for the guitar button to move unobstructed from the distal end to the proximate end of a keyhole enabling the guitar button to be removed from the keyhole. This movement of the respective pivoting swing arms to this position is identified as the "unlocked position.

FIGS. 19 and 20 illustrate the securing mechanism 12. Preferably securing mechanism is a rotating knob having a plurality of tabs or splines providing multiple surface areas for a guitarist to engage and twist the rotating knob onto the threaded bolt which is attached to the primary body of the guitar strap locking system and which is presented through the hole in the guitar strap for mating attachment by the securing mechanism.

The invention claimed is:

1. A guitar strap locking system for a guitar having a guitar button having a knob and a stem and an associated guitar strap said guitar strap locking system comprising:

a primary body having a sidewall, a bottom and a top defining an internal cavity sufficiently sized to receive said knob of said guitar button;

a guitar button receiving channel carried by said primary body for receiving said guitar button;

said guitar button receiving channel having a proximate end and a distal end;

a locking mechanism carried by said primary body for locking said guitar button within said receiving channel;

a bias for manipulating the positioning of said locking mechanism with respect to said receiving channel;

said locking mechanism including a biased swing arm wherein said bias is capable of manipulating said locking mechanism into the receiving channel blocking the positioning of the guitar button from said proximate end of said guitar button receiving channel to the distal end of said guitar button receiving channel;

said locking mechanism being capable of being manipulated by the guitar button for overcoming said bias and positioning said locking mechanism in a manner wherein the passage to the distal end of said guitar button receiving channel is unblocked for the positioning of the guitar button at the distal end of said guitar button receiving channel;

said locking mechanism being capable of being biased by said bias wherein the locking mechanism returns to blocking the receiving channel preventing the positioning of the guitar bottom from said distal end to said proximate end thereby locking the guitar button in position within the receiving channel; and said locking mechanism being capable of being manipulated by an external force for overcoming said bias and positioning said locking mechanism in a manner wherein the passage to the proximate end of said guitar button receiving channel is unblocked for the positioning of the guitar button from the distal end to the proximate end for subsequent removal from the receiving channel.

2. The guitar strap locking system adapted for attachment to a guitar strap.

3. A method of securing a guitar strap to a guitar having a guitar button having a knob and a stem said method comprising:

providing a guitar strap locking system comprising:

a primary body having a sidewall, a bottom and a top defining an internal cavity sufficiently sized to receive said knob of said guitar button;

a guitar button receiving channel carried by said primary body for receiving said guitar button;

said guitar button receiving channel having a proximate end and a distal end;

a locking mechanism carried by said primary body for locking said guitar button within said receiving channel;

a bias for manipulating the positioning of said locking mechanism with respect to said receiving channel;

said locking mechanism including a biased swing arm wherein said bias is capable of manipulating said locking mechanism into the receiving channel blocking the positioning of the guitar button from said proximate end of said guitar button receiving channel to the distal end of said guitar button receiving channel;

said locking mechanism being capable of being manipulated by the guitar button for overcoming said bias and positioning said locking mechanism in a manner wherein the passage to the distal end of said guitar button receiving channel is unblocked for the positioning of the guitar button at the distal end of said guitar button receiving channel;

said locking mechanism being capable of being biased by said bias wherein the locking mechanism returns to blocking the receiving channel preventing the positioning of the guitar bottom from said distal end to said proximate end thereby locking the guitar button in position within the receiving channel; and said locking mechanism being capable of being manipulated by an external force for overcoming said bias and positioning said locking mechanism in a manner wherein the passage to the proximate end of said guitar button receiving channel is unblocked for the positioning of the guitar button from the distal end to the proximate end for subsequent removal from the receiving channel;

positioning a guitar button in the proximate end of said receiving channel;

manipulating the guitar button towards the distal end of said receiving channel such that said guitar button engages said locking mechanism with sufficient force to manipulate said locking mechanism wherein said locking mechanism pivots in a manner clearing the path of the guitar button to said distal end of said receiving channel; and manipulating the guitar button to the distal end of said receiving channel enabling the locking mechanism to return to the position where in the receiving channel is blocked by the locking mechanism locking the guitar button in position at the distal end of the receiving channel.

* * * * *